G. R. COULS.
TOOL HOLDER.
APPLICATION FILED NOV. 8, 1920.
1,397,796.
Patented Nov. 22, 1921.
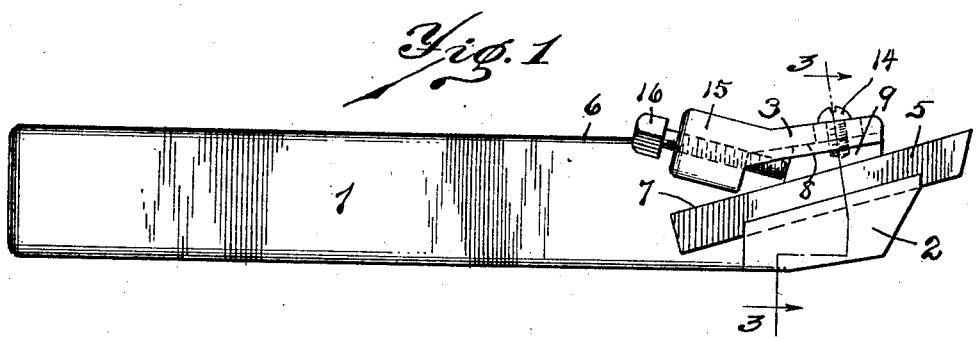
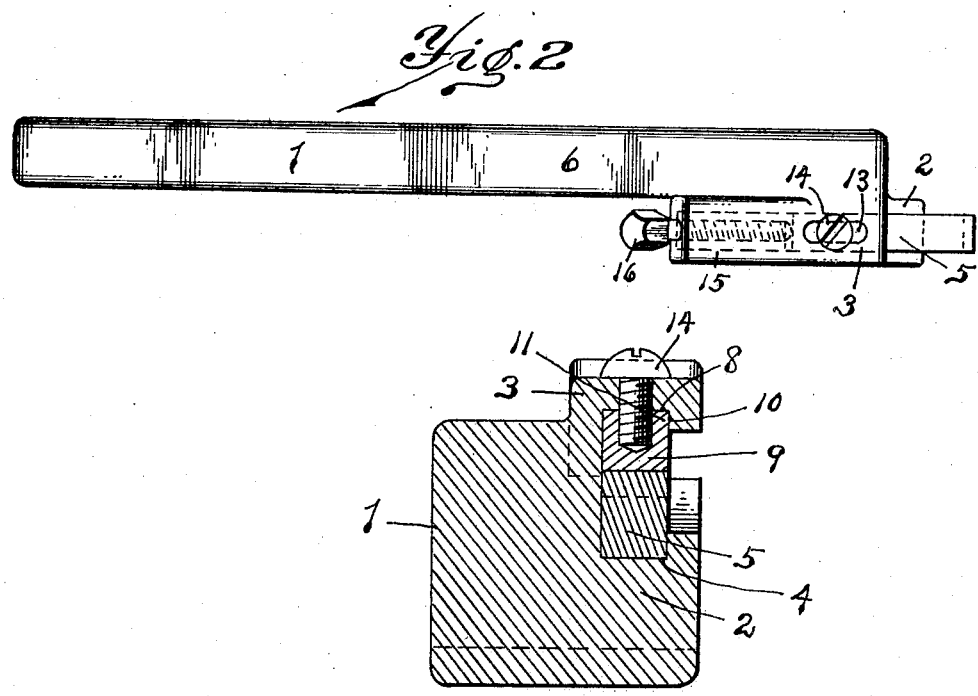
George R. Couls, INVENTOR.
BY
Edward N. Pagelsen, ATTORNEY.

UNITED STATES PATENT OFFICE.

GEORGE R. COULS, OF DETROIT, MICHIGAN.

TOOL-HOLDER.

1,397,796. Specification of Letters Patent. Patented Nov. 22, 1921.

Application filed November 8, 1920. Serial No. 422,436.

*To all whom it may concern:*

Be it known that I, GEORGE R. COULS, a citizen of the United States, and residing at Detroit, in the county of Wayne and State of Michigan, have invented a new and Improved Tool-Holder, of which the following is a specification.

This invention relates to tool holders for lathes, planers, shapers and other metal working machines wherein a shank is secured in a tool post or other proper tool supporting device and is adapted to receive small lengths of high speed steels and other cutting metals constituting the cutting tools, and its object is to so construct the tool holder that the tools will not be broken by the tool securing portions of the tool holder.

In the accompanying drawing, Figure 1 is a side elevation and Fig. 2 is a plan of this improved tool holder. Fig. 3 is a section on the line 3—3 of Fig. 1 on a larger scale.

Similar reference characters refer to like parts throughout the several views.

Tool holders are made both right and left handed, depending upon the side of the shank to which the tool is secured, and in the present case, a right hand holder is shown. The shank 1 of the holder shown in the drawing is substantially rectangular in cross section and at its front end are two brackets 2 and 3. The lower bracket 2 has its upper surface formed with a channel or groove 4 to receive the tool or bit 5, the channel being formed to fit the tool, which, in the present case, is square in cross section but may be of any other desired form. The upper surface of this bracket is preferably but not necessarily inclined to the upper side 6 of the shank so that the upper face 7 of the tool will be at the desired angle to the work.

The upper bracket 3 has its lower face 8 inclining forwardly toward the upper face of the lower bracket 2 so that a wedge 9 may fit between the tool or bit 5 and this lower face 8. I prefer to form this lower face and the upper side of the wedge 9 with longitudinal shoulders 10 and 11 so that the wedge will always be parallel to the tool. To prevent the wedge from being lost, I form the bracket 3 with a slot 13 through which a screw 14 extends into the wedge.

A hub 15 on the rear end of the bracket 3 is threaded to receive the set screw 16 by means of which the wedge is forced forward between the bracket 3 and the tool 5 to lock the tool. The long bearing of this wedge on the tool, and particularly its bearing on the tool near its cutting end not only serves to hold the tool rigidly in position but it avoids the danger of the tool breaking at the set screw when that engages the top of the tool to hold it in position in the holder.

It will be noticed that the pressure of the screw 16 is against the rear end of the wedge 9 and that it forces the wedge toward the cutting end of the tool. The construction permits the tool to be so mounted that little more than its cutting edge projects beyond the brackets 2 and 3 and that the tool is supported substantially up to its cutting end.

I claim:—

1. A tool holder comprising a shank and a tool supporting bracket on one side of the shank provided with a groove into which the tool may fit with its cutting end projecting from the end of the holder, a second bracket above the first and having its lower side at an angle to the upper side of the lower bracket, a wedge mounted in engagement with the lower side of the upper bracket with its lower face parallel to the upper face of the lower bracket, and a set screw mounted in the rear end of said upper bracket and engaging the rear end of said wedge to force it forward toward the cutting end of the tool.

2. A tool holder comprising a shank and a pair of brackets on one side of the shank, the opposing faces of the brackets inclining toward each other toward the front end of the shank, a wedge and means to support the wedge between the brackets, the sides of the wedge being at substantially the same angle to each other as the opposite faces of the brackets, a hub at the rear end of one of the brackets, and a set screw mounted therein to engage the rear end of said wedge to force it toward the cutting end of the tool.

3. A tool holder comprising a shank having a flat side at one end, a pair of brackets of less length than the shank extending from said flat side at the end of the shank, one of the brackets being grooved to receive a tool, a wedge adapted to fit between the tool and the other bracket, and a screw mounted in one of the said brackets to engage the wedge to lock the tool in position.

4. A tool holder comprising a shank and a pair of brackets on said shank, one of said brackets being grooved to receive a tool, a wedge adapted to fit between the tool and the other bracket, and means to move the wedge longitudinally of the shank.

GEORGE R. COULS.